US007762777B2

(12) United States Patent
Vanderhye et al.

(10) Patent No.: US 7,762,777 B2
(45) Date of Patent: Jul. 27, 2010

(54) SAVONIUS WIND TURBINE CONSTRUCTION (75) Inventors: Robert A. Vanderhye, 801 Ridge Dr., McLean, VA (US) 22101-1625; Brendon Nunes, Ajax (CA); Gregory J. T. Lowe-Wylde, Oshawa (CA)

(73) Assignee: Robert A. Vanderhye, McLean, VA (US)

( * ) Notice: Subject to any disclaimer, the term of this patent is extended or adjusted under 35 U.S.C. 154(b) by 1119 days.

(21) Appl. No.: 11/113,176

(22) Filed: Apr. 25, 2005

(65) Prior Publication Data

US 2006/0153682 A1   Jul. 13, 2006

Related U.S. Application Data (60) Provisional application No. 60/643,109, filed on Jan. 12, 2005.

(51) Int. Cl.
*F03D 11/00* (2006.01)
(52) U.S. Cl. ............... 416/132 B; 416/243; 416/204 R; 416/DIG. 9; 415/4.4
(58) Field of Classification Search ............. 416/132 B, 416/231 B, 235, 243, 242, DIG. 9, 204 R; 415/4.4, 907; 290/44, 55
See application file for complete search history.

(56) References Cited

U.S. PATENT DOCUMENTS

| 1,697,574 A | | 1/1929 | Savonius |
| 1,766,765 A | | 6/1930 | Savonius |
| 1,935,097 A | * | 11/1933 | Nelson ................ 415/4.2 |
| 2,677,344 A | | 5/1954 | Annis |
| 4,245,958 A | * | 1/1981 | Ewers ................ 416/197 A |
| 4,359,311 A | * | 11/1982 | Benesh ............... 416/197 A |
| 4,830,570 A | | 5/1989 | Benesh |

FOREIGN PATENT DOCUMENTS

| JP | 9287549 | 11/1997 |
| JP | 11294313 | 10/1999 |

OTHER PUBLICATIONS

Turner, "Making a simple Savonius wind turbine", www.ata.org.au/70byosav.htm, Admitted Prior Art.
Khan, "Model and Prototype Performance Characteristics of Savonius Rotor Windmill", Wind Engineering, vol. 2, #2, 1978, pp. 75-85.

(Continued)

*Primary Examiner*—Ninh H Nguyen (57) ABSTRACT

A Savonius vertical axis wind turbine rotor has at least three spokes, at least two vanes, and fasteners. Each spoke includes a hub with central opening and arcuate ribs integral with the hub and extending radially outwardly. Channels are defined in at least one surface of each rib. Vanes of sheet material generally conform to an inner or outer surface of the ribs and have openings aligned with the channels. First fasteners pass through the openings into the channels and cooperate with second fasteners provided within the channels. Each hub may define a clamp which cooperates with a shaft, the clamp including a radial slot in the hub communicating with the central opening and fastener receiving elements on opposite sides of the slot. The vanes may overlap the central opening so that there is spillover from one vane to the next when the rotor is rotated by the wind.

24 Claims, 10 Drawing Sheets

OTHER PUBLICATIONS

Rensselaer School of Engineering, "Winding Upward with Corks and Turbines", Sep. 20, 2003, www.eng.rpi.edu/soenews/update.

Saba et al., "Twisted Bladed Rotor For Savonius Wind Turbines", 2004.

"Output Characteristics of Savonius Windmill Used as a Power Source", 2000, www.nkk.affrc.go.jp/eng/topics/reseach/2000/00/nkk/nkk00014.pdf.

"Projects", p. 2, http://uwstudentfpweb.uwyo.edu/F/Freekboy/Projects.htm.

* cited by examiner

SAVONIUS WIND TURBINE CONSTRUCTION

CROSS REFERENCE TO RELATED APPLICATION

This application claims the benefit of U.S. Provisional Application 60/643,109 filed Jan. 12, 2005, the disclosure of which is incorporated by reference herein.

BACKGROUND AND SUMMARY OF THE INVENTION

The Savonius vertical axis wind turbine (VAWT) is the definitive primarily drag type vertical axis wind turbine. It uses a plurality of curved vanes which are mounted for rotation about a substantially vertical axis. In most conventional Savonius rotors, only two vanes are provided, and the vanes have generally an S-shape when viewed from above or below.

Although invented in the 1920s (see U.S. Pat. Nos. 1,697,574 and 1,766,765, for example), and despite its numerous advantages (including high torque, simplicity of construction, no need for speed limiting, not significantly affected by turbulence, no need to orient it into the wind—that is OMNI-direcitonality—and ability self-start at very low wind speed), the Savonius wind turbine has never been marketed on a significant commercial scale. Most are home made (see *Making a simple Savonius wind turbine* by Lance Turner, www.ata.org.au;) with rigid discs on top and bottom of each set of vanes. However, there are three common types [as described in the Turner article].

The first conventional type uses a central shaft to provide the majority of the support for the vanes. This design has the advantage of allowing the rotor to be supported only from the bottom, and can minimize weight. However, it does not have optimum efficiency.

The second and third conventional types (differing form each other only in the particular curvatures of the vanes) allow spillover of the wind from one vane to another by horizontally spacing the proximate ends of the vanes. However, this conventionally requires utilizing disc shaped solid supports above and below the vanes, and mounting structures both above and below the unit. This increases cost and limits the versatility of the units.

Another type of VAWT, which has individual Savonius rotors but mounted so that it has only some features in common with a conventional Savonius, is disclosed in U.S. Pat. No. 4,830,570. This patent shows a rotor having bearings connected to support ribs at both the top and bottom of the curved blades (vanes) and a solid exterior single central shaft remote from (not adjacent) the interior blade vertical edges (proximate edges) of both blades. In this construction the Savonius wind turbine desirable feature of omni-directionality is eliminated by mounting two rotors on horizontally spaced vertical axes with a deflector plate between them, and a partition plate with tail extending perpendicular to the deflector plate to orient the assembly into the wind.

According to the present invention, a Savonius wind turbine rotor, and wind turbine utilizing the rotor, are provided which are simple, easy and inexpensive to manufacture and assemble, yet very versatile. In the preferred embodiment, spokes are provided which mount the curved vanes of the Savonius wind turbine to a central shaft in a secure, yet typically removable, and versatile manner. The spokes and vanes are particularly configured so as to not require (although they may be provided in some circumstances) tapped holes, which would significantly increase the cost of the wind turbine and complicate its manufacture. The spokes and vanes are easy to construct—for example the spokes can be cut, with any curvature and dimensions, from relatively thick sheet material using a computer controlled device, such as a laser cutter. The vanes may be made of relatively thin sheet material, and openings for receipt of fasteners punched or otherwise formed therein, without the need for tapping. The spokes are affixed to the shaft in a simple and secure manner—which may be removable—and the vanes may then be easily assembled to the spokes by low skill labor simply using conventional fasteners like nuts and bolts.

Practice of the invention can result in an inexpensive, yet efficient, strong, long-lasting, and versatile Savonius wind turbine rotor, and turbine. The invention can be utilized to turn a generator and generate electricity, to drive a propeller on a boat, to pump water, or for a wide variety of other uses. When used to generate electricity, the turbine may readily be mounted on a flat roof of a building.

According to one aspect of the present invention there is provided a Savonius vertical axis wind turbine rotor comprising: A plurality of spokes, each spoke comprising a hub having a substantially central opening, a plurality of at least partially arcuate ribs extending substantially radially outwardly from the hub with inner and outer surfaces, and a plurality of channels defined in at least one of the inner and outer surface of each rib. A plurality of vanes of sheet material generally conforming to an inner or outer surface of a rib and having openings therein operatively aligned with the channels. And, first fasteners passing through the openings into the channels and cooperating with second fasteners provided within the channels to securely hold the vanes to the ribs, so that the vanes assume an at least partially curved configuration presenting alternately a substantially concave and substantially convex curvature to wind as the rotor rotates about a substantially vertical axis.

Preferably the openings in the ribs are non-tapped, and the first fasteners comprise bolts and the second fasteners comprise nuts.

A number of different configurations may be provided for mounting the hub to one or more central shafts. In a first example, the hub central opening has keying surface manifestations adapted to cooperate with a shaft having cooperating keying surface manifestations, to securely affix the hub to the shaft. In a second example, the hub central opening has first keying surface manifestations, and the rotor further comprises a clamp adapted to cooperate with a shaft to be securely affixed to the shaft [the clamp has second keying surface manifestations cooperating with the first keying surface manifestations so that the clamp securely affixes the hub to the shaft when clamped to the shaft]. In a third, and preferred, example, each hub itself defines a clamp adapted to cooperate with a shaft so that the hub is securely affixed to the shaft. In this case preferably the clamp comprises: surfaces of the hub defining a substantially radial slot in the hub communicating with the central opening; first and second fastener receiving elements on opposite sides of the slot and fixed to the hub; and a fastener extending between the fastener receiving elements to draw the surfaces of the hub together Channels may be formed in the ribs, or in the hub, at opposite sides of the slot in the third example. Preferably, two or three vanes are provided, and the vanes generally conform to the outer surfaces of the ribs, and the vanes overlap the central opening so that there is spillover from one vane to the next when the rotor is rotated by wind. The desirability of spillover, for efficiency, etc., is discussed in co-pending application Ser. No. 10/854,280 filed May 27, 2004 (the disclosure of which is hereby incorporated by reference herein).

While the vanes may comprise any material suitable for practical use in a Savonius wind turbine (including highly engineered fabrics, like modern sail cloth), preferably the vanes comprise, or are characteristically similar to, aluminum sheets having a thickness of between about 10-125 thousandths of an inch, or polycarbonate having a thickness of between about 20-200 thousandths of an inch. Although the spokes may also be made of any material suitable for practical use in a wind turbine, preferably the spokes comprise, or are characteristically similar to, aluminum plates having a thickness of between about ¼-½ inch. The spokes may have cutouts formed along the length thereof for reducing weight without significantly reducing strength. Also, the vanes may have end terminations comprising bent portions abutting cooperating surfaces of the ribs, and the channels may be laser or water-jet cut into the ribs at the inner or outer surfaces thereof (in fact the entire spokes, with integral hub and ribs, may be laser or water-jet cut from standard plate).

The rotor according to the invention may further comprise at least one shaft extending through the hub substantially central openings and affixed to the hubs. The rotor is desirably in combination with a device (e. g. bearing) which mounts the shaft for rotation about a substantially vertical axis, and an output device operatively connected to the shaft, so as to define a Savonius VAWT.

A broad description of the aspect of the invention described above, yet relating to another aspect of the invention, relates to a Savonius vertical axis wind turbine rotor comprising: at least three spokes, each spoke comprising a hub having a substantially central opening, two or three at least partially arcuate ribs substantially integral with the hub and extending substantially radially outwardly from the hub; a plurality of vanes of sheet material generally conforming to the ribs; and a plurality of removable fasteners operatively connecting the spokes to the vanes so that the vanes assume an at least partially curved configuration presenting alternately a substantially concave and substantially convex curvature to wind as the rotor rotates about a substantially vertical axis.

The interconnection between the spokes and vanes and shaft may be as set forth above. As an alternative connection of the spokes and vanes, channels are defined in a bottom or top surface of each of the ribs, with a plurality of cross-bores in the ribs intersecting the channels; each vane has top and bottom edges co-operable with the rib channels to substantially securely fit therein; and a plurality of openings are positioned to align with the cross bores in the channels; and the fasteners pass through the bores and channels to securely hold the vanes to the ribs.

Picking up on the last description, that is according to another aspect of the invention a Savonius vertical axis wind turbine rotor is provided comprising: A plurality of spokes each spoke comprising a hub having a substantially central opening, a plurality of at least partially arcuate ribs extending substantially radially outwardly from the hub with channels defined in a bottom or top surface of each of the ribs, and a plurality of cross-bores in the ribs intersecting the channels. A plurality of vanes of sheet material each generally conforming to the ribs, each vane having: top and bottom edges cooperable with the rib channels to substantially securely fit therein; and a plurality of openings positioned to align with the cross bores in the channels. And, a plurality of fasteners passing through the bores and channels to securely hold the vanes to the ribs so that the vanes assume an at least partially curved configuration presenting alternately a substantially concave and substantially convex curvature to wind as the rotor rotates about a substantially vertical axis.

The fasteners may each comprise a bolt passing through a bore from an outer or inner surface of the rib and connected to a nut adjacent the inner or outer surface of a rib. Also, the vanes may comprise, or be characteristically similar to, aluminum sheets having a thickness of between about 10-125 thousandths of an inch, and the ribs comprise, or may be characteristically similar to, aluminum plates or bars.

According to another aspect of the present invention there is provided a Savonius VAWT spoke comprising: A hub having a substantially central opening therein for receipt of a shaft. A clamp associated with the hub adjacent the substantially central opening (e. g. for deforming the central opening so as to clamp the spoke on a shaft). A pair of ribs substantially integral with the hub and extending substantially radially outwardly from the hub; the ribs having at least partially curved inner and outer surfaces. And, a plurality of surface manifestations formed in at least one of the inner and outer surfaces of the ribs for receipt of fasteners to hold vanes to the ribs. The ribs have distal tips, and preferably the surface manifestations are substantially T-shaped openings in at least the outer surfaces of the ribs, and overlap the central opening on opposite sides of the hub. The spoke may further comprise wind flow directors mounted on the ribs extending substantially from the distal tips to the hubs. The spoke is preferably formed by laser, plasma, or water jet cutting from a sheet of material, e. g. of or having characteristics similar to aluminum plate having a thickness of between about ¼-½ inch. Preferably the aluminum is anodized.

It is the primary object of the present invention to provide an improved Savonius VAWT, and rotor and spoke components thereof, which can be easily, securely, and cost-effectively constructed for use for almost any purpose to which a VAWT can be put. This and other objects of the invention will become clear from an inspection of the detailed description of the invention, and from the appended claims.

DETAILED DESCRIPTION OF THE DRAWINGS

Figure 1:
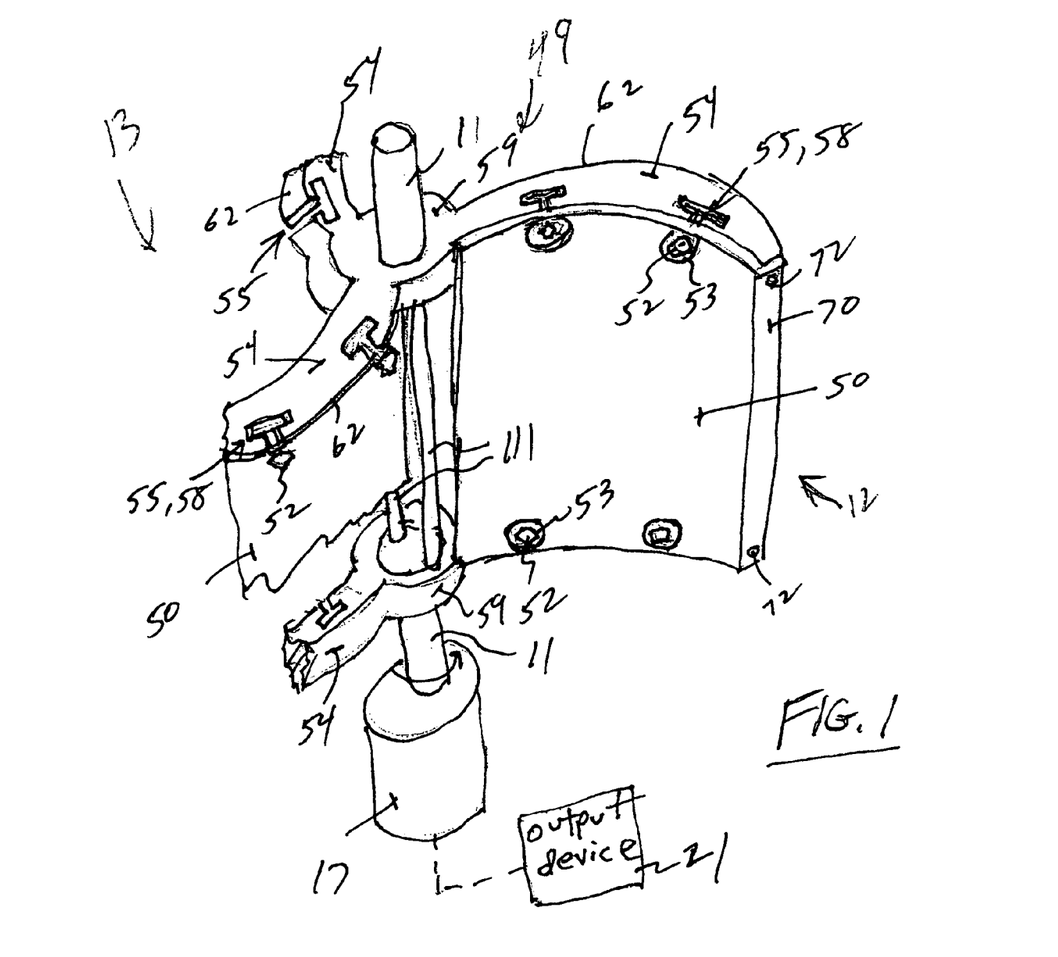
FIG. 1 is a top perspective schematic view of an exemplary Savonius VAWT according to one aspect of the present invention.

FIG. 1 schematically illustrates, generally by reference numeral 13, an exemplary Savonius VAWT according to the present invention, including a Savonius rotor 12 that is constructed in a simple, effective, versatile, and cost-effective manner. The rotor 12 preferably includes a shaft 11, with a supporting bearing 17 mounting the shaft 11 for rotation about a substantially vertical axis, and an output device 21 (such as an electrical generator, propeller of a boat, water pump, or the like) is operatively connected to the shaft 11. In the embodiment actually illustrated in FIG. 1, a double shaft 111 arrangement—as in U.S. patent application Ser. No. 10/854,280 filed May 27, 2004—is provided between the hubs 59, which are connected to single shaft stubs 11, but just as easily a single, continuous, shaft 11 may be provided (such as illustrated in FIG. 3).

Figure 2:
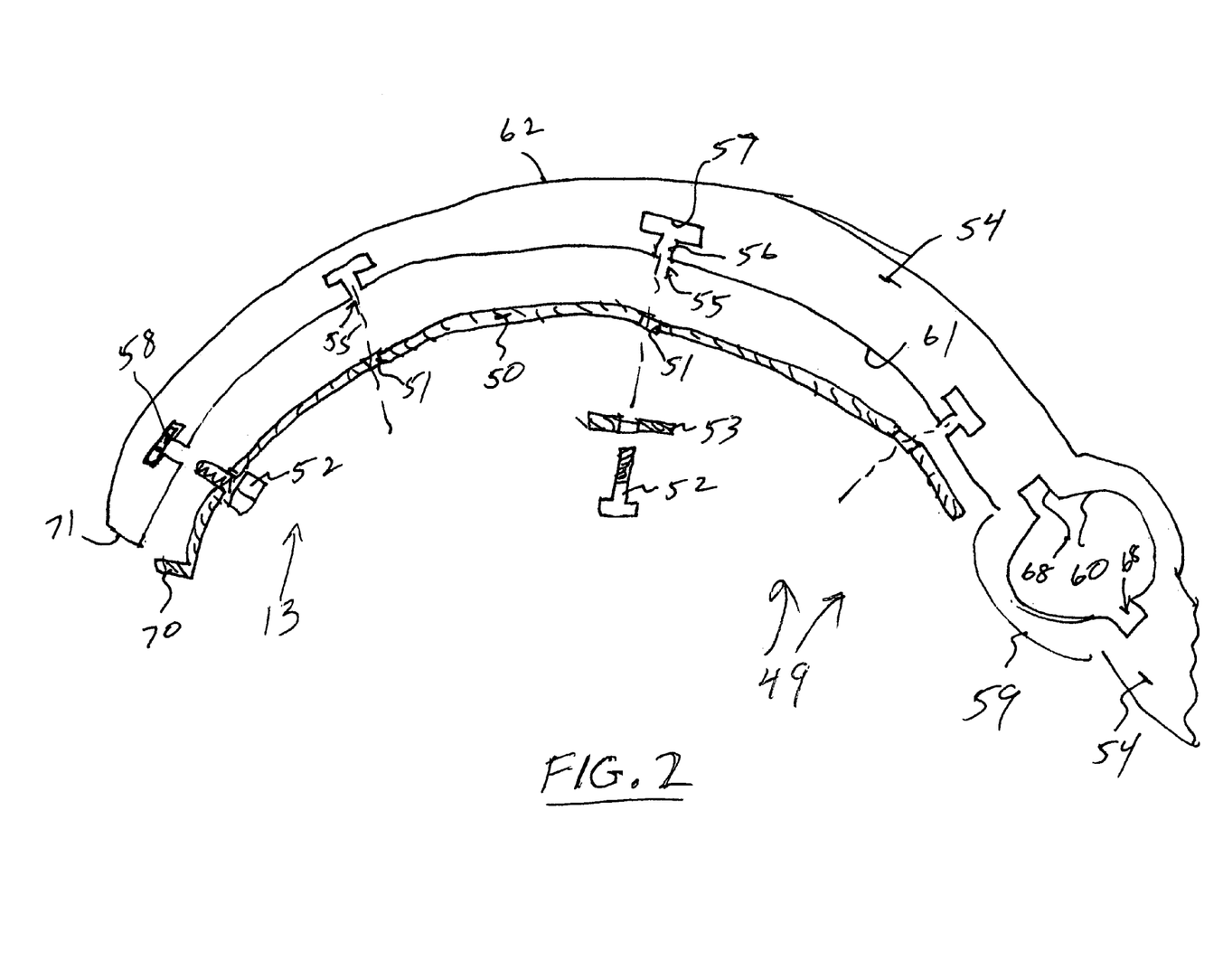
FIG. 2 is a detailed top plan view of one half of a first example of one spoke of the Savonius VAWT of FIG. 1 in association with a vane (shown in cross-section) and fasteners.
Figure 3:
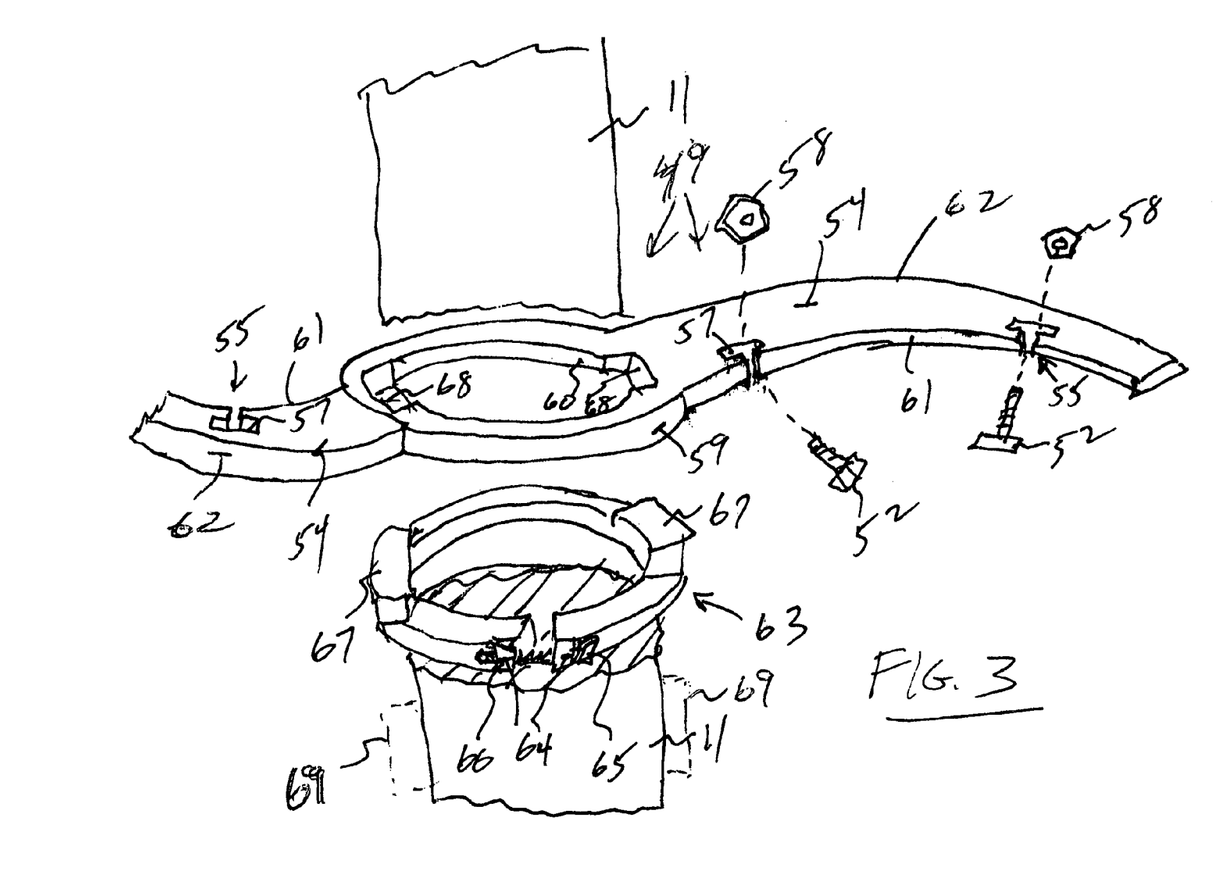
FIG. 3 is a detailed perspective view, partly in section and partly in elevation, of the spoke of FIG. 2 in cooperation with a clamp, comprising a second example according to the invention, which affixes the spoke to a central shaft.

FIGS. 1-3 schematically illustrate exemplary spokes 49 and vanes 50 of a rotor 12 having the advantages according to the present invention.

The vanes 50 may be of any sheet material suitable for use in a Savonius wind turbine, including modern engineered sail cloth. However it is preferred that the vanes 50 are of relatively rigid sheet material (though the sheets themselves are flexible). That is, the vanes 50 may be aluminum, titanium, carbon fiber or other composite material, Lexan™ polycarbonate (transparent or opaque, transparent being particularly appropriate when the rotor 12 drives a boat propeller), or other suitable material having characteristics (particularly strength, weight, and manufacturability) comparable (including superior) to those of aluminum. For example the vanes 50 may be of aluminum sheet between about 10 and 125 thousandths of an inch thick, or polycarbonate sheet between about 20 and 200 thousandths of an inch thick.

At spaced locations along each vane 50 where it will cooperate with a rib 54 of a spoke 49 are a plurality of openings 51, designed to receive mechanical fasteners (for example bolts 52, possibly with washers 53 between the bolt heads and vane 50).

The spokes 49 each comprise a plurality of at least partially arcuate ribs 54 (preferably two, three, or four are provided substantially equally spaced around a shaft 11—two are illustrated in FIGS. 2 & 3 and three in FIG. 1) extending generally radially outwardly from a hub 59 with a substantially central opening 60 therein. The hub 59 and ribs 54 are preferably integral. The spokes 49 may be of any material suitable for use in a VAWT. In a preferred embodiment, the spokes 49 are of readily laser, plasma, or water-jet cut light weight but rigid plate, such as aluminum or titanium plate between ¼ and ½ inch thick, carbon fiber or other composite material, or the like. Any plate material having characteristics similar (including superior) to those of aluminum plate is preferred. Anodized aluminum is particularly desirable.

Cut into the spokes 49, particularly the ribs 54 thereof, are generally T-shaped channels 55, having a stem portion 56 for receipt of a bolt 52 shaft, and a cross portion 57 for receipt of a nut 58. The substantially central opening 60 provided in the hub 59 is for receiving a shaft 11 or the like.

While first and second fasteners in the form of bolts 52 and nuts 58 are preferred, other conventional or to be hereafter developed fasteners may alternatively, or in addition, be provided.

Note that the channels 55 are provided in the inner (convex) surfaces 61 of the ribs 54 as seen in all of FIGS. 1-3, but as seen at the top left of FIG. 1 they may be provided in the outer (concave) surfaces 62 of ribs 54.

The construction of FIGS. 1-3 is highly desirable since it allows the vanes 50 to be securely held to the spokes 49, without likely high fatigue points, yet the connections may be made easily and inexpensively, and the construction easily assembled (and disassembled if desired) by unskilled labor. For example, the holes 51 and channels 55 may be punched, drilled (either generally, or during installation), or laser cut, and no drilling or tapping is necessary (although it may be provided in some circumstances).

The hub 59 may be connected to the shaft 11 by any suitable conventional or hereafter developed mechanism. In a first embodiment, the shaft 11 itself has surface manifestations (such as the key blocks illustrated schematically in dotted line at 69 in FIG. 3) formed along all, or parts, thereof, which cooperate with the complimentarily shaped keyed surface manifestations 68 associated with opening 60. Once the manifestations 68, 69 are moved into cooperating relationship the spoke 49 may be secured to the shaft 11 thereat by removable fasteners, welding, a friction fit, or any other suitable mechanism or technique.

A second, even more suitable mechanism, for securing a spoke 49 to the shaft 11 is schematically illustrated in FIG. 3. A clamp ring 63 having spaced ears 64 is provided having an interior diameter larger than the shaft 11 until the ears 64 are drawn together by conventional fasteners (e. g. bolt 65 and nut 66) to provide a high clamping force [similar to, but typically more substantial than, a conventional hose clamp for an automobile radiator]. The ring 63 has two or more spaced keying projections 67 thereon which are designed to cooperate with keyed manifestations 68 of the opening 60 of the hub 59. The keyed action between the projections 67 and openings 68 prevents rotation of the hub 59 with respect to shaft 11, yet easily allows the spokes 49 to be positioned anywhere along the shaft 11 desired, while the shaft 11 may remain completely circular throughout. The clamping action of the ring 63 securely affixes the spoke 49 at the proper vertical location along the shaft 11. While the ring 63 is preferably removable, by tightening or loosening the bolt 65, the ring 63 may alternatively be substantially permanently attached to the shaft 11, e. g. by welding after tightening.

The vanes 50 may also have remote/distal (from hub 59) end terminations 70 (see FIGS. 1 & 2). Any suitable end termination 70 may be provided. In the embodiment illustrated in FIGS. 1 & 2, the distal end terminations 70 are simply a substantially 90 degree bent portion of the vane 50, which abuts a similar surface 71 at the end of each rib 54. If desired, fasteners (such as releasable fasteners 72 shown in FIG. 1) may hold a termination 70 to a surface 71, or a frictional engagement or adhesive may be utilized.

A third, and preferred, embodiment for holding the spokes 49 to the vanes 50 and the shaft 11 is illustrated in FIGS. 4-7. In this embodiment, the central opening 60 in the hub 59 is essentially circular, and slightly larger than the outside diameter of the shaft 11. The hub 59 itself defines the clamp for holding the spoke 49 onto the shaft 11. The clamp (seen in FIG. 4) comprises surfaces 75 of the hub 59 defining a substantially radial slot 76 in the hub 59, the slot 76 communicating with the central opening 60. First and second fastener receiving elements 77 are provided on opposite sides of the slot 76. The elements 77 may simply be blocks of material (e. g. aluminum) welded, or otherwise affixed (e. g. by adhesive, or cast with), to the hub 59, with openings (not shown) extending substantially parallel to the top surface of hub 59, and substantially tangent (typically not exactly tangent) to the opening 60. The openings in elements 77 allow the passage of a fastener, such as bolt 78, therein, or therethrough. One of the elements 77 may have an internally threaded opening to receive the threads of the bolt 78, or both elements 77 may have smooth through-extending openings through which the bolt 78 passes, with a nut 79 engaging the screw threaded shaft of the bolt 78 opposite the slot 76 from the head of the bolt 78.

Figure 4:
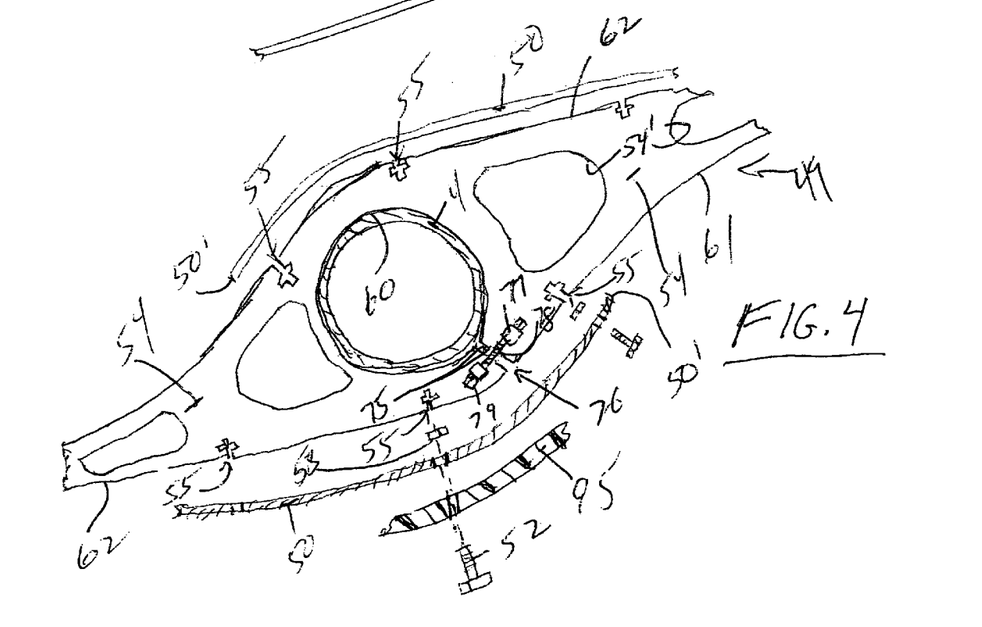
FIG. 4 is a top detailed plan view of part of a third example of spoke according to the invention, particularly the hub and portions of the ribs adjacent to the hub, and schematically illustrating vanes (one in cross-section) that could be associated therewith.

In use of the spoke 49 of FIG. 4, an end of shaft 11 is placed in opening 60 and the spoke is slid along the shaft 11 to the desired "vertical" (during ultimate use as a VAWT) location. There, the bolt 78 is passed into operative association with the elements 77 (and 79 if provided), narrowing or closing the slot 76, and causing the interior surface of the hub 59 defining the opening 60 to tightly engage the shaft 11 so there is no slippage therebetween.

The FIGS. 4-7 embodiment is particularly advantageous since it allows the vanes 50 to be overlapped and thus to provide spillover from one vane 50 to another, increasing efficiency. The openings 55 are preferably provided on the outer surfaces 62 of the ribs 54, and at the hub 59 too, as seen in FIG. 4. In fact, openings 55 are preferably provided on the outer surface of hub 59, past the centerline diameter of opening 60, and on opposite sides of the slot 76, to provide significant overlap of the vanes 50, as indicated by the locations of the inner/proximate end terminations 50' thereof in FIGS. 4, 6, and 7. Thus, when the shaft 11 is rotating in the direction D indicated in FIG. 7, the air flowing—as indicated by arrows F in FIG. 7—from the substantially concave surface of the top vane 50 in FIG. 7 spills over to the substantially concave surface of the bottom vane 50 in FIG. 7.

Figures 5, 6, 9, 10:
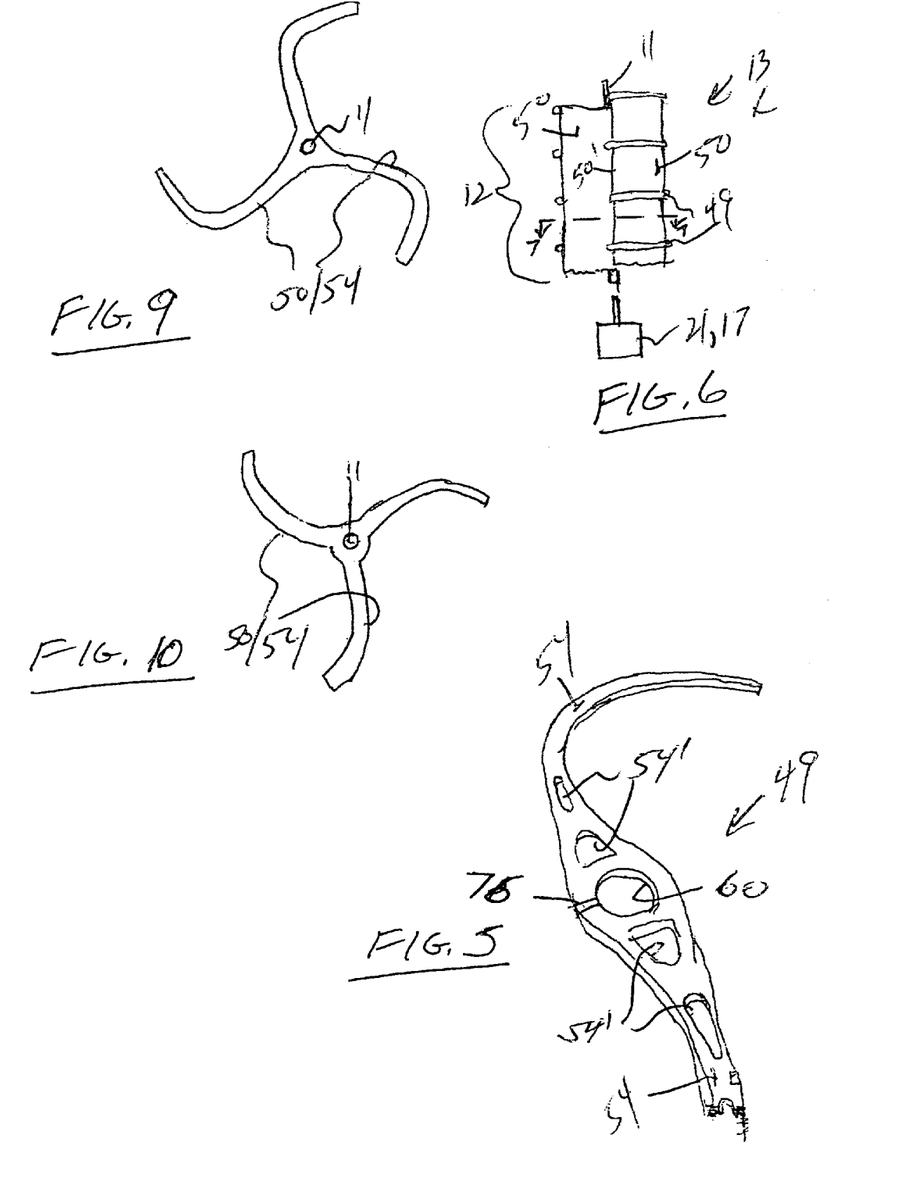
FIG. 5 is a bottom perspective view of the majority of the spoke of FIG. 4.
FIG. 6 is a schematic side view of a VAWT using the spokes and vanes of FIGS. 4 & 5 in combination with a bearing and output device like those in FIG. 1.
FIGS. 8-10 are schematic top plan views of exemplary curvatures the ribs and vanes of the rotors of FIGS. 1-7 may have.

FIG. 6 schematically shows a completed rotor 12, and VAWT 13, using a plurality of the spokes 49 of FIGS. 4 & 5, including a plurality of spokes 49 intermediate the top and bottom spokes 49. The spokes 49 in FIG. 6 are schematically shown with the vanes 50 mounted on interior surfaces thereof for clarity of illustration, although it usually is desirable to mount the vanes on the exterior surfaces of the ribs 54 of the spokes 49. Note that many spokes are provided, e. g. vertically spaced from each other about 1-4 feet depending upon the details of the construction, and the vanes 50 may be single sheets of material vertically traversing all of the spokes 49 and radially traversing all the ribs 54 on one side of the spokes 49. Alternatively, after every set of three or four spokes 49, the spokes 49 of the next set may be offset (typically between about 30-90 degrees).

Figure 7:
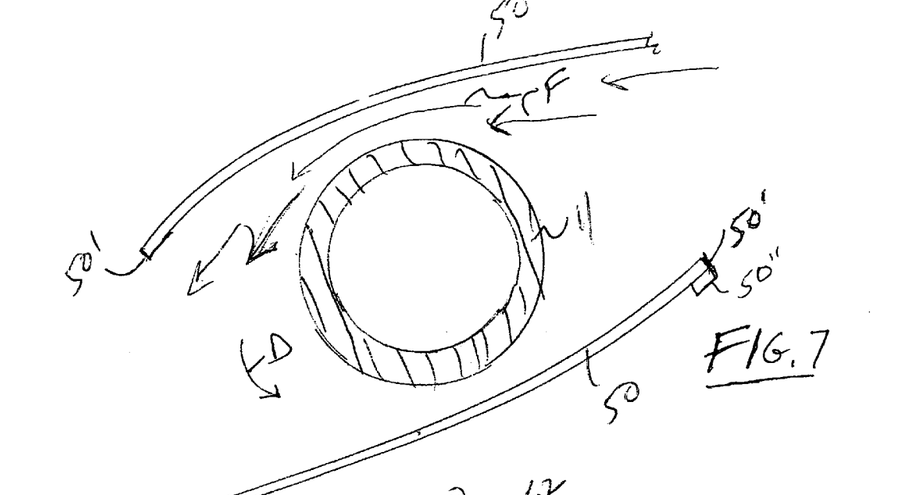
FIG. 7 is a schematic view taken along lines 7-7 of FIG. 6 showing spillover between one vane and another during operation of the VAWT of FIG. 6.

As another feature of the spokes 49 of the FIGS. 4-7 embodiment, cutouts 54' may be provided in the ribs 54 (and hub 59) to reduce weight of the rotor 12 without significantly reducing strength. The cutouts 54' may easily be formed during laser or other cutting of the plates from which the spokes 49 are constructed. To increase the strength of the vanes 50 at the edges thereof, the proximate and distal end terminations 50', 70 thereof may be reinforced (shown for the lower vane 50 in FIG. 7) with another strip of material (e. g. a strip of metal or polycarbonate 50" as shown in FIG. 7 when the vane 50 is polycarbonate), or bent over at the edges (e. g. if the vane 50 is of aluminum or other metal).

FIG. 4 also shows a construction in which a vane 50 (the lower vane 50 in FIG. 4) is not necessarily of rigid material. In FIG. 4 the lower vane 50 is of high performance sail cloth. In order to facilitate its attachment to the spoke 49, it is desirable to provide a strip 95 of hard material, such as a hard (yet flexible shape) plastic, so that the bolts 52 clamp the sail cloth of the lower vane 50 between the strip 95 and the outer surface 62 of the ribs 54. The strip 95 helps prevent tearing of the sail cloth.

The ribs 54 and vanes 50 in all of the FIGS. 1-7 embodiments may have any at least partially arcuate shape that is effective for a Savonius VAWT. One particularly efficient shape for the two rib/vane version is illustrated in FIG. 8, while two different particularly efficient shapes for the three rib/vane version are illustrated in FIGS. 9 & 10.

Figure 8:
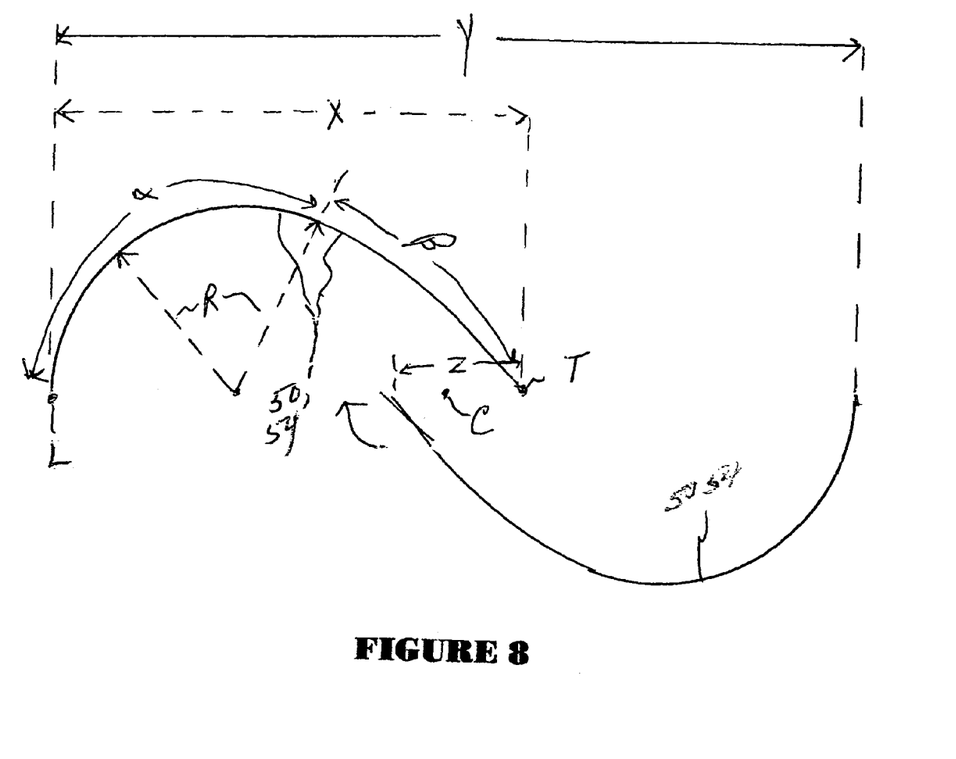

In the FIG. 8 configuration, the vanes 50 have about a 30-35% overlap of their trailing edges T. C is the center of Y. From the leading edge L of each vane/rib 50/54 there may be a circular arc portion α with radius R, and a non-circular arc portion β. Z may be between 0.3 and 0.35 X, R may equal 0.26 Y, and Y equals 2 X-Z. The circular arc portion α is over 90 degrees, e. g. about 112-113 degrees in the exemplary embodiment illustrated.

In the FIG. 9 configuration the vanes/ribs 50/54 have a curvature of about 1:2.5, a skew factor of about ¾, and medium outer radius. In the FIG. 10 configuration the vanes/ribs 50/54 have a curvature of about 1:5, a skew factor of about ¾, and low outer radius.

Figure 11:
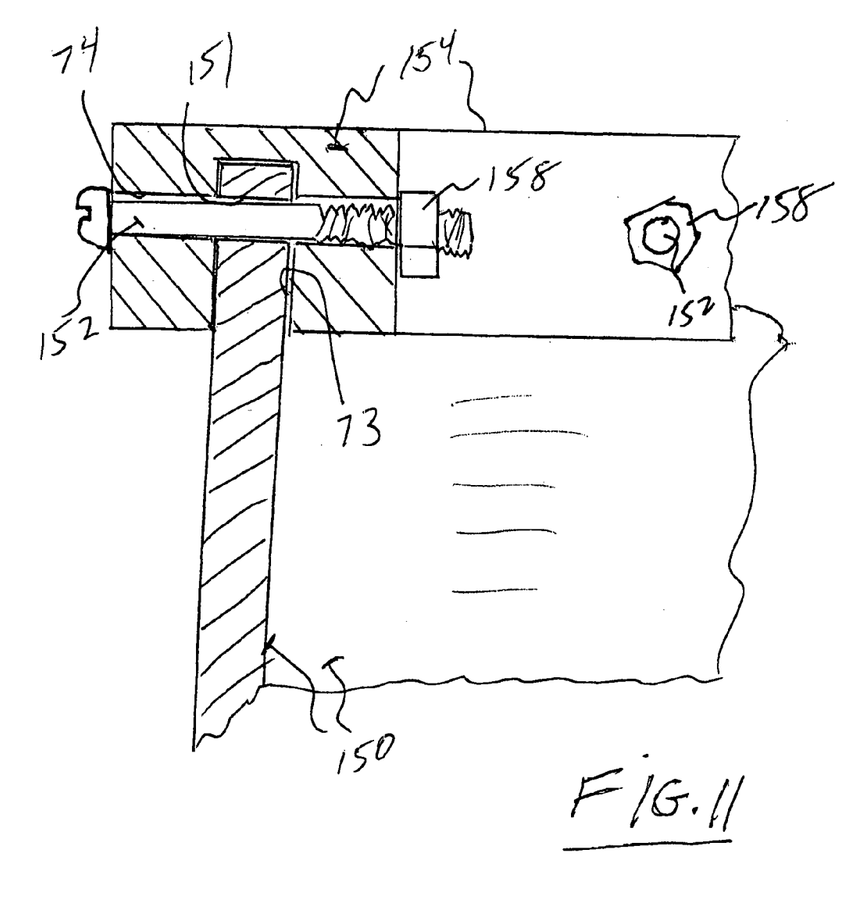
FIG. 11 is a side view, partly in cross-section and partly in elevation, of another connection mechanism between vanes and ribs that may be provided according to the invention.

FIG. 11 is a side view, partly in cross-section and partly in elevation, of another connection mechanism between vanes and ribs for a Savonius rotor that may be provided. In this embodiment components comparable to those in the FIGS. 1-7 embodiment are shown by the same reference numeral only preceded by a "1".

In the FIG. 11 embodiment each vane 150 is substantially the same as the vanes 50, including having openings 151 therein. The ribs 154 have a semi-annular or arcuate channel 73 machined or cut in the bottom [for the upper rib 154, in the top of the lower rib 154 (not shown)] thereof, with through-extending preferably non-tapped bores 74 intersecting the channel 73. The vane 150 sits snuggly in channel 73 substantially along the entire length thereof and is held in place at spaced locations by bolts 152 passing through the openings 74, 151 and held in place by nuts 158.

Figure 12:
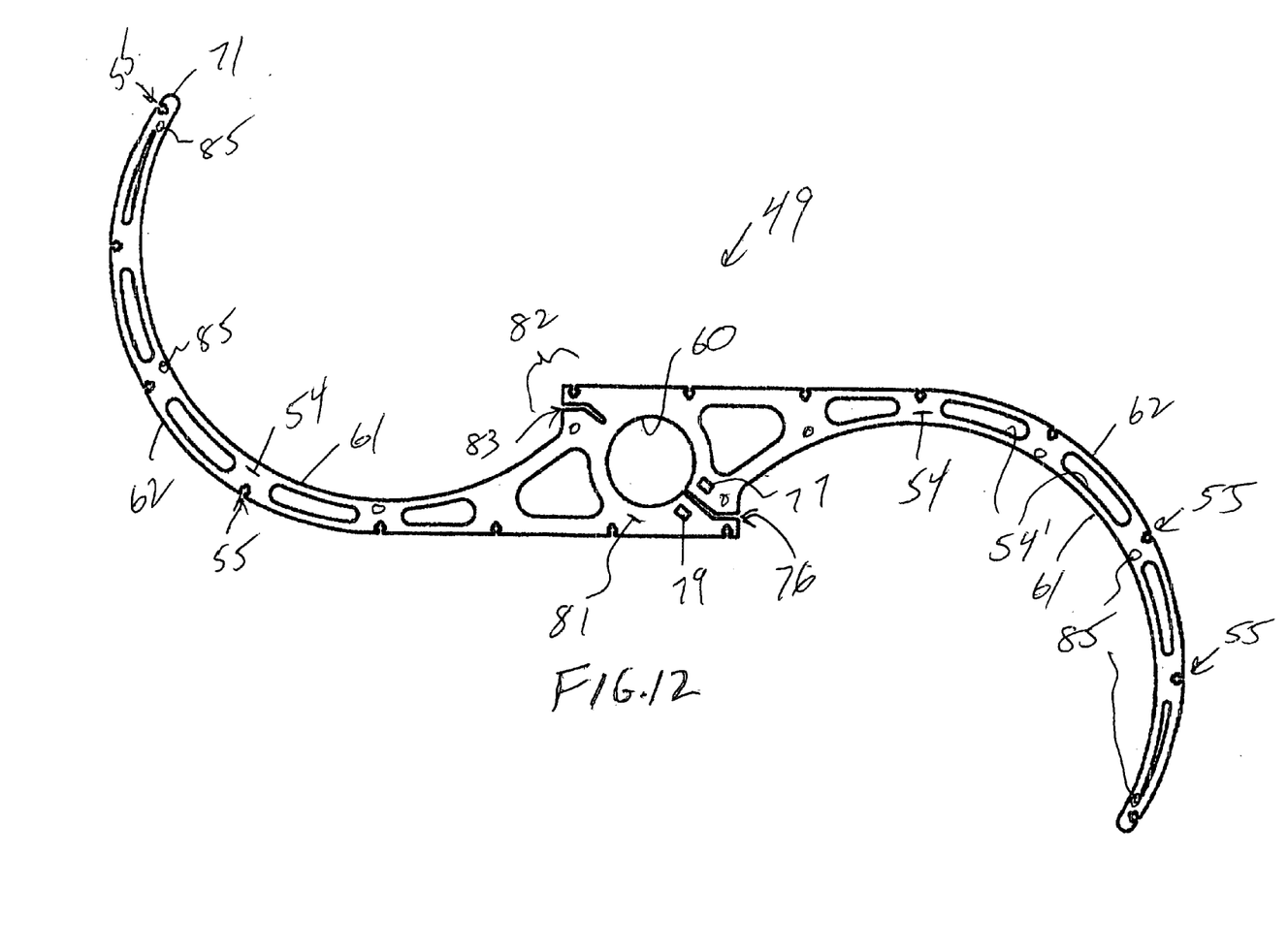
FIG. 12 is a top plan view of another version of spoke according to the present invention.
Figure 13:
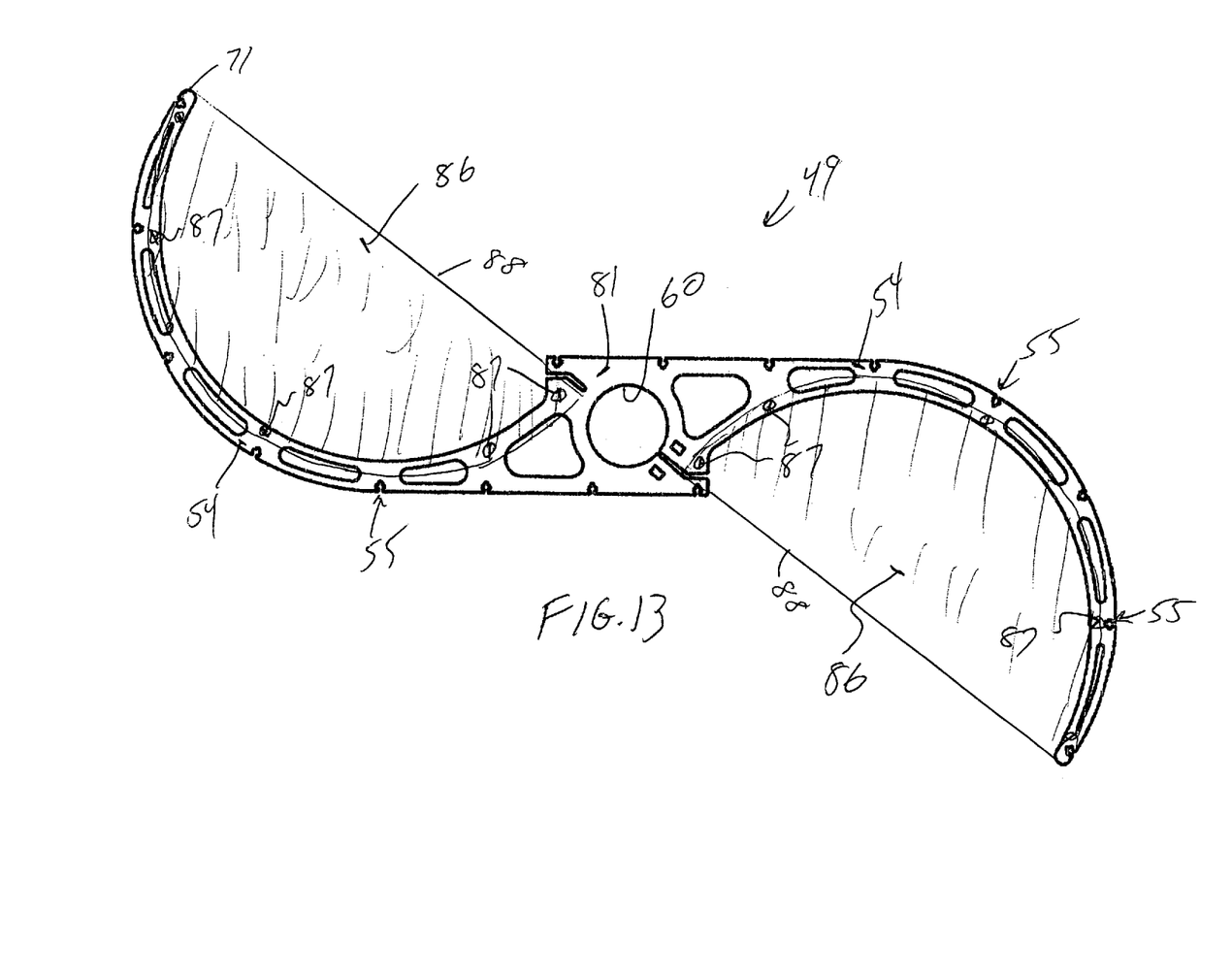
FIG. 13 is a top plan view of the spoke of FIG. 12 when used as the top spoke of a wind turbine, shown in combination with a wind flow director.

FIGS. 12 and 13 show another modification of a preferably integral spoke 49 like those of FIGS. 4-7, with comparable reference numerals referring to comparable structures. In the embodiment of FIGS. 12 and 13 the hub 81 is different than the hub 59, having an extension past the opening 60 on each outer surface 62 of ribs 54 in order to provide significant overlap between vanes (50) attached to the outer surfaces 62 of the ribs 54 using the substantially T-shaped openings 55 (that is, the surface manifestations 55 significantly overlap the central opening 60 on opposite sides of the hub 81). This results in corner structures 82 of hub 81 on opposite sides of the opening 60. This also means that the slot 76 is longer than in the FIG. 4 embodiment, and to insure that the hub can tightly clamp a shaft in opening 60, a slit 83 is preferably provided in the material adjacent corner 82.

While it is preferred that the spoke 49 of FIG. 12 be integral, under some circumstances a second slot 76 may be provided in place of slit 83, meaning that the spoke 49 is two piece. In this case a second set of clamping elements 77, 79 are provided straddling the second slot 76, with a bolt 78 extending therebetween. In this case also the spoke 49 may be made in two parts by injection molding a strong durable plastic or composite material with all the openings 55, 85, 54', etc. formed during the injection molding process.

The spoke 49 of FIGS. 12 and 13—especially when used as the top or bottom spoke 49 of a wind turbine 13—preferably has openings 85 therein spaced along the inner surfaces 61 of the ribs 54. The holes 85 may be laser cut, punched, drilled, cast, or otherwise formed. They receive screws, bolts, rivets, or other fasteners (preferably removable fasteners)—shown schematically at 87 in FIG. 13—to hold wind flow directors 86 onto the top (for the top spoke 49) or bottom (for the bottom spoke 49) surfaces of ribs 54. The exemplary wind flow directors 86 illustrated in FIG. 13 are in the form of thin polycarbonate plates cut substantially in the shape of ribs 54 (sometimes approximating a semicircle in plan) and extending substantially from a distal tip 71 of a rib 54 to the hub 81, e. g. a corner structure 82 thereof. Alternatively, at least the edges 88 of the flow directors 86 may have an airfoil or inverse airfoil shape.

The wind flow directors 86 substantially keep wind from spilling out of the top and bottom of the VAWT made from the spokes 49 so as to increase efficiency. While it is preferred that the wind flow directors 86 take the shapes of the ribs 54, they may have other shapes depending upon the particular air flow associated with an particular design of spoke 49, but it is generally undesirable to use discs at the top and bottom since that adds a great deal of material, most of which is wasted. Typically no flow directors 86 are provided at other spokes 49 aside from the top and bottom ones.

Figure 14:
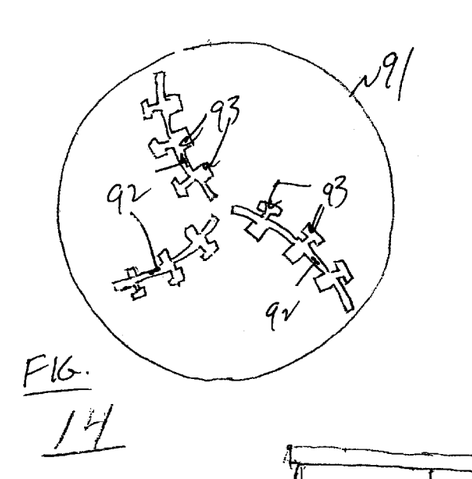
FIG. 14 is a top plan view of a disc for another example of a Savonius VAWT.
Figure 15:
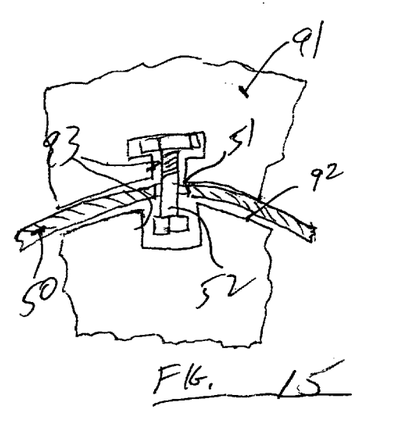
FIG. 15 is a detailed view of part of a vane connected to the disc of FIG. 14.
Figure 16:
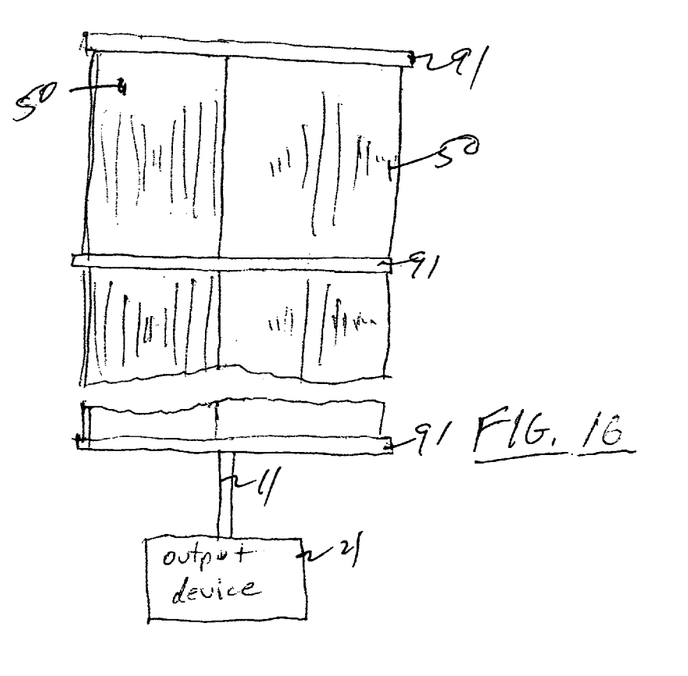
FIG. 16 is a side view of an exemplary Savonius VAWT utilizing discs similar to those in FIGS. 14 and 15.

FIGS. 14-16 show an embodiment that does not have many of the advantages of the FIGS. 1-7 embodiments because it uses discs 91 instead of spokes 49, but it does have a connecting mechanism for the vanes 50 that is similar. In this embodiment the discs 91 have slits 92 formed therein through which the vanes 50 extend from one disc 91 to the next. Communicating with the slits 92 are openings 93 (like the openings 55) which receive bolts 52 extending through openings 51 in the vanes 50 (see FIG. 15) and engaging nuts 58.

FIG. 14 shows a disc 91 (with no central shaft) which can accommodate three vanes 50. FIG. 16 shows a VAWT 13 which has no central shaft—solely a shaft 11 at the bottom connected to output device 21 and supported by a bearing (not shown) and discs like 91 except that they have slits for only two vanes 50, and those vanes overlap (as is conventional for many Savonius VAWTs with disc supports).

The invention also relates to methods of making, constructing, or using, any of the structures or assemblies described above.

The invention is to be accorded the broadest interpretation possible to encompass all equivalent structures, devices, and procedures, limited only by the prior art. All numerical values are approximate, and all narrow ranges within a broad range are specifically included herein, and the reference to "a" particular device also includes a plurality of such devices. The term "operatively", in association with any other term implying some sort of connection or association, means—as it normally does—any connection or association between the components operatively connected, associated, or the like, so as to allow effective functioning thereof.

What is claimed is:

1. A Savonius vertical axis wind turbine rotor comprising; a plurality of spokes, each spoke comprising a hub having a substantially central opening, a plurality of at least partially arcuate ribs extending substantially radially outwardly from the hub with inner and outer surfaces, and a plurality of channels defined in at least one of the inner and outer surface of each rib;
a plurality of vanes of sheet material generally conforming to an inner or outer surface of a rib and having openings therein operatively aligned with the channels; and
first fasteners passing through the openings into the channels and cooperating with second fasteners provided within the channels to securely hold the vanes to the ribs, so that the vanes assume an at least partially curved configuration presenting alternately a substantially concave and substantially convex curvature to wind as the rotor rotates about a substantially vertical axis.

2. A rotor as recited in claim 1 wherein openings in the vanes are non-tapped, and wherein the first fasteners comprise bolts and the second fasteners comprise nuts.

3. A rotor as recited in claim 1 wherein the hub central opening has keying surface manifestations adapted to cooperate with a shaft having cooperating keying surface manifestations, to securely affix the hub to the shaft.

4. A rotor as recited in claim 1 wherein the hub central opening has first keying surface manifestations; and further comprising a clamp adapted to cooperate with a shaft to be securely affixed to the shaft, the clamp having second keying surface manifestations cooperating with the first keying surface manifestations so that the clamp securely affixes the hub to the shaft when clamped to the shaft.

5. A rotor as recited in claim 1 wherein the hub defines a clamp adapted to cooperate with a shaft so that the hub is securely affixed to the shaft.

6. A rotor as recited in claim 5 wherein the clamp comprises: surfaces of the hub defining a substantially radial slot in the hub communicating with the central opening; first and second fastener receiving elements on opposite sides of the slot and fixed to the hub; and a fastener extending between the fastener receiving elements to draw the surfaces of the hub together.

7. A rotor as recited in claim 6 wherein the channels are formed in the ribs and hub at opposite sides of the slot.

8. A rotor as recited in claim 6 wherein two vanes are provided, the vanes generally conforming to the outer surfaces of the ribs, and the vanes overlapping the central opening so that there is spillover from one vane to the next when the rotor is rotated by wind.

9. A rotor as recited in claim 1 wherein the vanes generally conform to the outer surfaces of the ribs, and the vanes overlap the central opening so that there is spillover from one vane to the next when the rotor is rotated by wind.

10. A rotor as recited in claim 1 wherein the vanes comprise, or are characteristically similar to, aluminum sheets having a thickness of between about 10-125 thousandths of an inch, or polycarbonate sheets having a thickness of between about 20-200 thousandths of an inch; and wherein the ribs comprise, or are characteristically similar to, aluminum plates having a thickness of between about ¼-½ inch.

11. A rotor as recited in claim 10 wherein the ribs have cutouts formed along the length thereof for reducing weight without significantly reducing strength; and wherein each spoke comprises an integral one-piece structure.

12. A rotor as recited in claim 10 wherein the vanes have end terminations comprising bent portions abutting cooperating surfaces of the ribs, and wherein the channels are laser, plasma, or water-jet cut into the ribs at the inner or outer surfaces thereof.

13. A rotor as recited in claim 1 further comprising at least one shaft extending through the hub substantially central openings and affixed to the hubs.

14. A rotor as recited in claim 13 in combination with a device which mounts the shaft for rotation about a substantially vertical axis, and an output device operatively connected to the shaft, so as to define a Savonius vertical axis wind turbine.

15. A rotor as recited in claim 1 wherein said channels are substantially T-shaped.

16. A rotor as recited in claim 1 wherein the ribs have distal tips; and further comprising wind flow directors mounted on the ribs extending substantially from the distal tips to the hubs.

17. A Savonius vertical axis wind turbine rotor comprising:
at least three spokes, each spoke comprising a hub having a substantially central opening, and two or three at least partially arcuate ribs substantially integral with the hub and extending substantially radially outwardly from the hub;
a plurality of vanes of sheet material generally conforming to the ribs; and
a plurality of removable fasteners operatively connecting the spokes to the vanes so that the vanes assume an at least partially curved configuration presenting alternately a substantially concave and substantially convex curvature to wind as the rotor rotates about a substantially vertical axis.

18. A rotor as recited in claim 17 with channels defined in a bottom or top surface of each of the ribs, and a plurality of cross-bores in the ribs intersecting the channels; each vane having top and bottom edges co-operable with the rib channels to substantially securely fit therein; and a plurality of openings positioned to align with the cross bores in the channels; and the fasteners passing through the bores and channels to securely hold the vanes to the ribs.

19. A rotor as recited in claim 18 wherein the fasteners each comprise a bolt passing through the bore from an outer or inner surface of a said rib and connected to a nut adjacent the inner or outer surface of the said rib.

20. A rotor as recited in claim 17 wherein the vanes comprise, or are characteristically similar to, aluminum sheets having a thickness of between about 10-125 thousandths of an inch, or polycarbonate sheets having a thickness between 20-200 thousandths of an inch, and wherein the ribs comprise, or are characteristically similar to, aluminum plates or bars.

21. A Savonius vertical axis wind turbine spoke comprising: a hub having a substantially central opening therein for receipt of a shaft; a clamp associated with the hub adjacent the substantially central opening; at least two ribs integral with the hub and extending substantially radially outwardly from the hub; the ribs having at least partially curved inner and outer surfaces; and a plurality of surface manifestations formed in at least one of the inner and outer surfaces of the ribs for receipt of fasteners to hold vanes to the ribs.

22. A Savonius spoke as recited in claim 21 wherein the ribs have distal tips; and wherein the surface manifestations are substantially T-shaped openings in at least the outer surfaces of the ribs, and overlap the central opening on opposite sides of the hub; and further comprising wind flow directors mounted on the ribs extending substantially from the distal tips to the hubs.

23. A Savonius spoke as recited in claim 21 wherein the surface manifestations are substantially T-shaped channels in at least the outer surfaces of the ribs.

24. A Savonius spoke as recited in claim 21 wherein the ribs have distal tips; and further comprising wind flow directors mounted on the ribs extending substantially from the distal tips to the hubs.

\* \* \* \* \*